United States Patent
Yao

(10) Patent No.: US 8,872,841 B2
(45) Date of Patent: Oct. 28, 2014

(54) GENERATING AND MERGING TWO HALFTONED IMAGES

(75) Inventor: Meng Yao, West Linn, OR (US)

(73) Assignee: Xerox Corporation, Norwalk, CT (US)

( * ) Notice: Subject to any disclaimer, the term of this patent is extended or adjusted under 35 U.S.C. 154(b) by 1792 days.

(21) Appl. No.: 11/953,617

(22) Filed: Dec. 10, 2007

(65) Prior Publication Data

US 2009/0147019 A1   Jun. 11, 2009

(51) Int. Cl.
  *G09G 5/02* (2006.01)
  *G09G 5/10* (2006.01)
  *G09G 3/36* (2006.01)
  *H04N 1/405* (2006.01)
  *H04N 1/46* (2006.01)
  *G06K 9/46* (2006.01)
  *H04N 1/387* (2006.01)
  *H04N 1/52* (2006.01)

(52) U.S. Cl.
  CPC ............... *H04N 1/52* (2013.01); *H04N 1/387* (2013.01); *H04N 1/405* (2013.01)
  USPC ............ 345/596; 345/690; 345/89; 358/3.06; 358/534; 358/3.13; 358/536; 358/3.09; 358/3.1; 358/3.3; 382/237

(58) Field of Classification Search
  CPC .............. H04N 1/4055; H04N 1/4051; H04N 1/40087; H04N 1/40081
  USPC .......... 345/596, 690, 89; 358/3.06, 534, 3.13, 358/536, 3.09, 3.1, 3.3; 382/237
  See application file for complete search history.

(56) References Cited

U.S. PATENT DOCUMENTS

| | | | | |
|---|---|---|---|---|
| 5,602,572 | A * | 2/1997 | Rylander | 358/3.09 |
| 5,734,752 | A * | 3/1998 | Knox | 358/3.28 |
| 6,252,971 | B1 * | 6/2001 | Wang | 382/100 |
| 6,804,373 | B1 * | 10/2004 | Tresser et al. | 382/100 |
| 7,286,682 | B1 * | 10/2007 | Sharma et al. | 382/100 |
| 2004/0085553 | A1 * | 5/2004 | Couwenhoven et al. | 358/1.9 |
| 2006/0120557 | A1 * | 6/2006 | Wang | 382/100 |

* cited by examiner

*Primary Examiner* — Jeffrey Chow
(74) *Attorney, Agent, or Firm* — Fay Sharpe LLP

(57) ABSTRACT

A method of producing a bit-map including rendering a bit-map of a first image using a first stochastic half-tone screen set, rendering a bit-map of a second image using a second stochastic half-tone screen set, wherein the first half-tone screen set and the second half-tone screen set have respectively associated stochastic half-tone screens, and wherein each half-tone screen of the second half-tone screen set is less than 100 percent correlated with, and not an inverse of, the associated half-tone screen of the first half-tone screen set; and merging the bit-map of the first image with the bit-map of the second image.

10 Claims, 4 Drawing Sheets

GENERATING AND MERGING TWO HALFTONED IMAGES

BACKGROUND

The subject disclosure is generally directed to a technique for merging a preprint image with a current or primary image.

In some situations, print output media employed comprises pre-printed media that includes, for example, a company logo, letterhead, an image, or a pattern. Such pre-printed media is commonly made to order and can be expensive.

When pre-printed media is used for printing, this essentially overlays two printed images, i.e., the image on the pre-printed media and the image the customer is printing, on paper. Pre-printed media is usually expensive. Instead of using pre-printed media, the same effect can be achieved on plain paper. This is done using two steps. First, the user sends a digital document that would generate the contents of pre-printed media, to the printer. This print job is not printed directly, but is rendered and saved as a halftoned bitmap. Later when customers print documents, the saved bitmap will be merged with the current print jobs to simulate the effect of printing using pre-printed media. This way, a user can get the results of pre-printed media on normal paper, resulting in significant savings for the customer.

Achieving the effect of pre-printed media requires merging two images, the image with the contents of the pre-printed media and the image that the customer tries to print on the pre-print media. While the merging is easier from the algorithm perspective when the two images are continuous tone images, not all printers can handle it this way due to the rendering architecture and memory constraints. This invention handles the merging of the two images after they have been halftoned. To achieve acceptable image quality for the merged image, the two images should be halftoned in an interdependent way.

DETAILED DESCRIPTION

Figure 1:
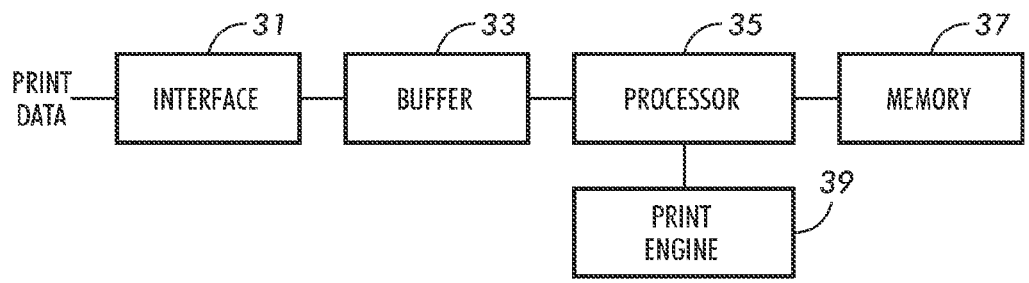
FIG. 1 is a schematic block diagram of an embodiment of a printing system.

FIG. 1 is a schematic block diagram of an embodiment of a printing apparatus that includes an interface 31 that receives print data, for example, from a host computer, and stores the print data in a buffer memory 33. A processor 35 is configured to process the print data to produce bit mapped raster data that is stored in a memory 37. A print engine 39 prints an image pursuant to the bit mapped raster data generated by the processor 35. The print engine 39 can be an electrophotographic print engine or an ink jet print engine, for example.

Printing is accomplished by selectively printing, depositing, applying or otherwise forming markings such as dots on a receiver surface or substrate that can be a print output medium such as paper or a transfer surface such as a transfer belt or drum. If a transfer surface is used, the image formed or printed on the transfer surface is appropriately transferred to a print output medium such as paper.

Figure 2:
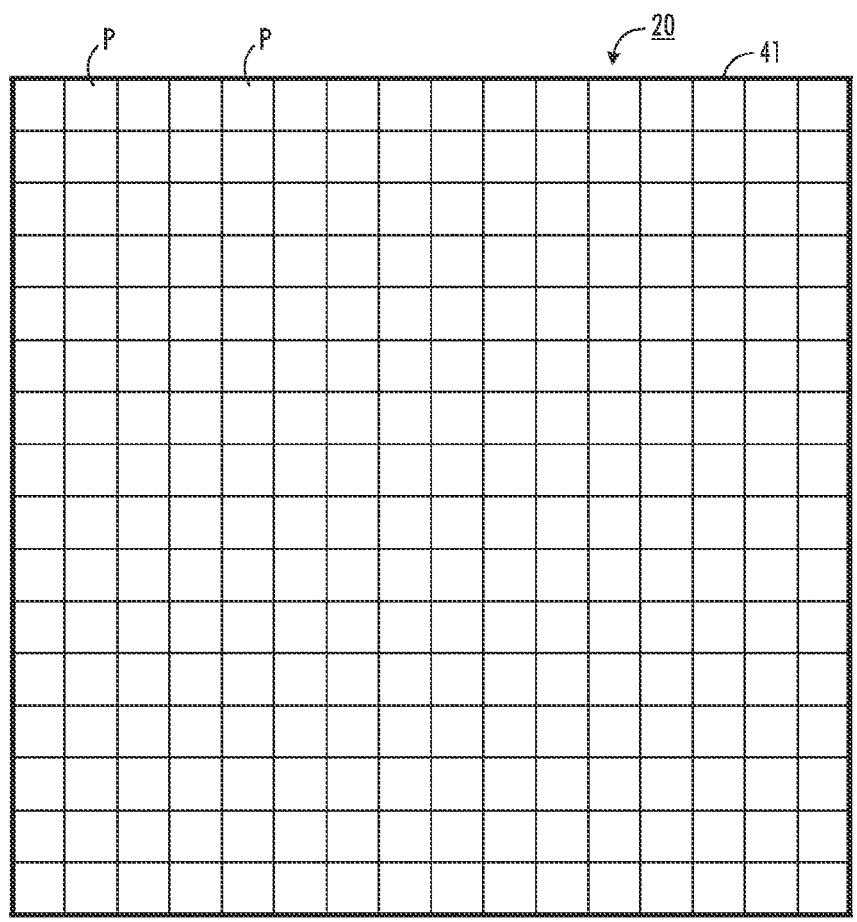
FIG. 2 is a schematic illustration of an embodiment of a pixel array.

FIG. 2 is a schematic illustration of an embodiment of an array 20 of pixel locations P that can be used to define the locations on a print output medium 41 that can be marked or printed. A marking of a particular primary color (e.g., cyan magenta, yellow or black) that is printed or deposited at a pixel location can be conveniently called a dot.

Each pixel location P can, for example, be marked or printed with (a) one or more non-black color dots (e.g., cyan, magenta or yellow), (b) a black dot by itself, or (c) a black dot and at least one non-black color dot.

Print data typically comprises continuous tone data (such as 32-bit or 24-bit pixel data), and halftoning (e.g., using one or more halftone threshold arrays) is commonly employed to map or transform continuous tone data to a halftoned bit map that contains one bit per pixel per primary color plane, for example.

Figure 3:
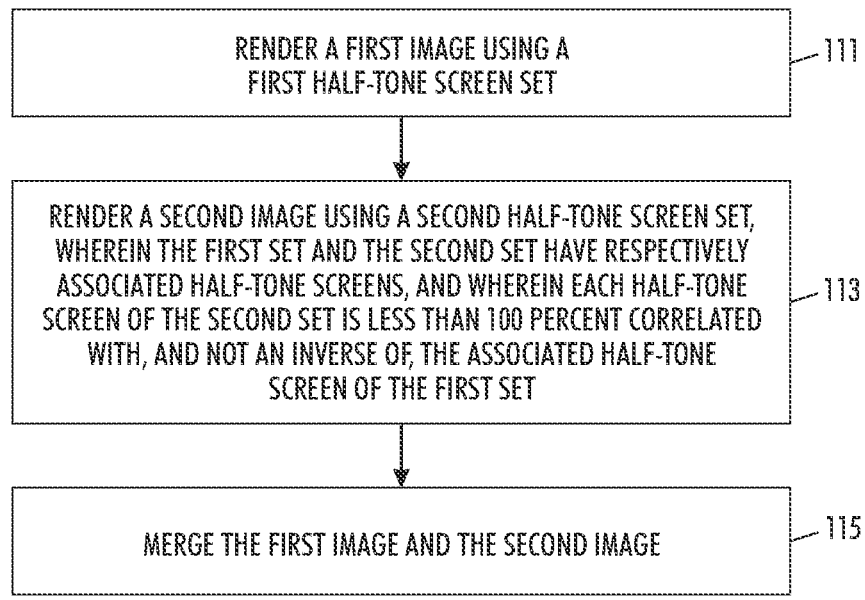
FIG. 3 is a schematic flow diagram of an embodiment of a procedure for merging a plurality of digital half-tone images.

FIG. 3 is a schematic flow diagram of a procedure for merging a plurality of digital half-tone images.

At 111 a first image is rendered using a first half-tone screen set.

At 113 a second image is rendered using a second half-tone screen set, wherein the first half-tone screen set and the second half-tone screen set have respectively associated screens, and wherein each screen of the second set is less than 100 percent correlated with, and not an inverse of, the associated screen of the first set.

By way of illustrative example, each half-tone screen set comprises a single half-tone screen that can be utilized for all of the primary colors utilized.

By way of further illustrative example, each half-tone screen set comprises a plurality of half-tone screens, for example, one for each primary color utilized, and each half-tone screen of one set has an associated half-tone screen in the other set, for example for the same color.

It should be appreciated that the half-tone screens employed herein can comprise stochastic half-tone screens.

At 115 the first and second half-tone images are merged, for example, by using a logical OR operation.

A half-tone screen of the second set (a second set half-tone screen) can be made from the associated half-tone screen of the first set (a first set half-tone screen) in various ways.

Figure 4:
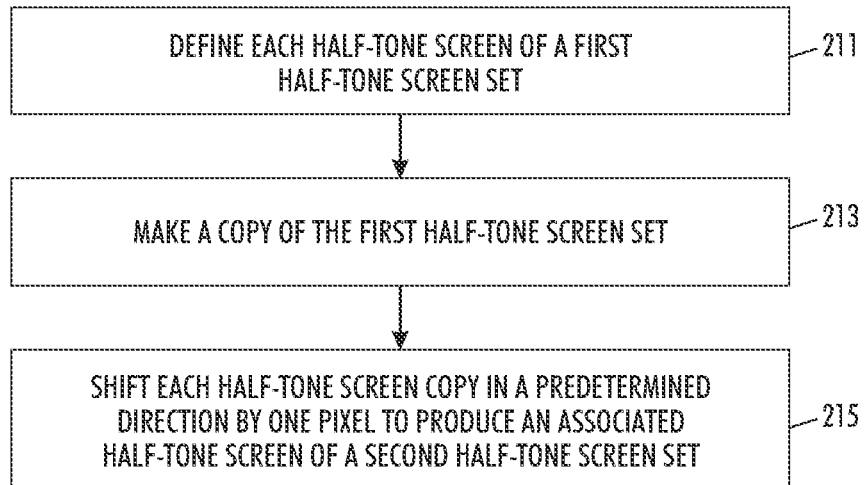
FIG. 4 is a schematic flow diagram of an embodiment of a procedure for generating half-tone screens employed in the procedure of FIG. 3.

For example, in accordance with FIG. 4, a second set half-tone screen can be made by copying a first set half-tone screen and shifting the copy by one pixel to produce the second set half-tone screen. More particularly, at 211 the half-tone screens for a first half-tone screen set are defined, and at 213 a copy of the first half-tone screen set is made. At 215 each halftone screen copy is shifted in a predetermined direction by one pixel to produce an associated half-tone screen of the second half-tone screen set.

Figure 5:
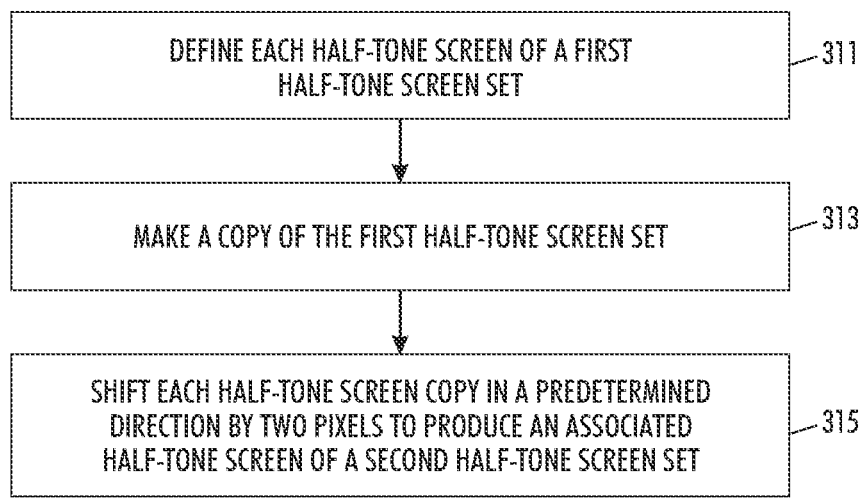
FIG. 5 is a schematic flow diagram of an embodiment of a procedure for generating half-tone screens employed in the procedure of FIG. 3.

As another example, in accordance with FIG. 5, a second set half-tone screen can be made by copying a first set half-tone screen and shifting the copy by two pixels to produce the second set half-tone screen. More particularly, at 311 the half-tone screens for a first half-tone screen set are defined, and at 313 a copy of the first half-tone screen set is made. At 315 each halftone screen copy is shifted in a predetermined direction by two pixels to produce an associated half-tone screen of the second half-tone screen set.

Figure 6:
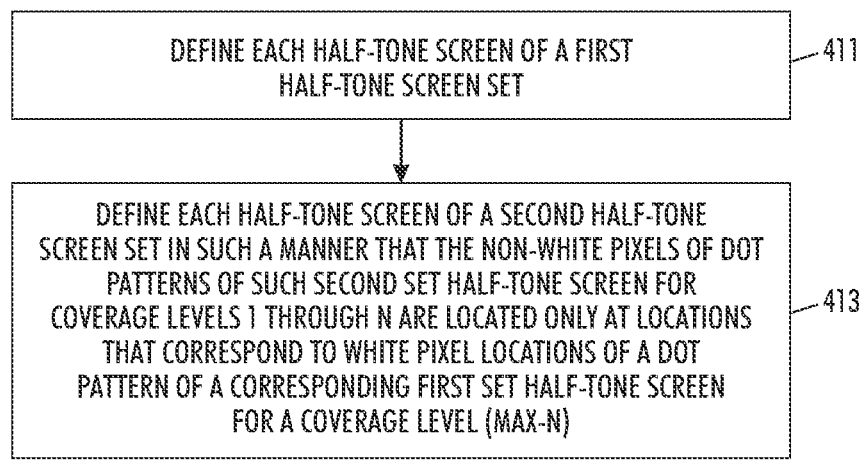
FIG. 6 is a schematic flow diagram of an embodiment of a procedure for generating half-tone screens employed in the procedure of FIG. 3.

As a further example, in accordance with FIG. 6, at 411 the half-tone screens for a first half-tone screen set are defined, and at 413 each screen of the second set is defined such that the non-white pixels of dot patterns of such second set half-tone screen for coverage levels between 1 and a predetermined coverage level N are located only at locations that correspond to white pixel locations of a dot pattern of a corresponding first set half-tone screen for a coverage level (MAX-N), wherein MAX is the maximum coverage level (e.g., 255 for 8-bit data) for the first screen and for the second screen. In other words, the non-white pixels of dot patterns for a second set half-tone screen for coverage levels between 1 and a predetermined coverage level N cannot be located at locations that correspond to non-white pixel locations of a dot pattern of a corresponding first set half-tone screen for a coverage level (MAX-N). By way of illustrative example N can be greater than zero and less than MAX/2, whereby N/MAX is greater than zero and less than 0.5.

By way of specific example, N can be about 0.25*MAX, whereby N/MAX would be about 0.25.

Pursuant to the foregoing, the non-white pixels of the associated first set half-tone screen and second set half-tone screen tend to be placed at non-overlapping locations.

By way of specific example in regard to FIG. 6, a first set half-tone screen dot pattern for a coverage level 192 (out of 255, for example) can be used as a constraining pattern in generating a corresponding second set half-tone second screen. In this first set half-tone screen dot pattern, ¾ of the pixels are non-white pixels, while ¼ of the pixels are white pixels. The locations corresponding to the white pixels of the first set half-tone screen are candidate locations for the associated second set half-tone screen for coverage levels 1 to 64, i.e., when generating dot patterns for coverage levels 1-64 for the second set half-tone screen, the non-white pixels can only be added to the locations corresponding to the white pixels of the constraining pattern.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A method of producing a bit-map comprising:
   rendering by a processor a bit-map of a first image using a first stochastic half-tone screen set;
   rendering by the processor a bit-map of a second image using a second stochastic half-tone screen set, wherein the first half-tone screen set and the second half-tone screen set have respectively associated stochastic half-tone screens, and wherein each screen of the second half-tone screen set is less than 100 percent correlated with, and not an inverse of, the associated screen of the first half-tone screen set; and
   merging by the processor the bit-map of the first image with the bit-map of the second image, including:
   applying non-white pixels of a screen of the second half-tone screen set at only white pixel locations of a screen of the first half-tone screen set based on coverage levels of the half-tone screens, wherein a basis includes that the screen of the second half-tone screen set has a coverage level less than a first threshold value and a screen of the first half-tone screen set is at a second threshold, wherein the first threshold is less than the second threshold.

2. The method of claim 1 wherein merging includes merging the bit-map of the first image with the bit-map of the second image using a logical OR operation.

3. The method of claim 1 wherein the non-white pixels of dot patterns of a half-tone screen of the second half-tone screen set for the coverage levels greater than 1 and less than a predetermined coverage level N are located only at locations that correspond to the white pixel locations of a selected dot pattern of the associated half-tone screen of the first half-tone screen set for a coverage level (MAX-N), wherein MAX is a maximum coverage level for the first half-tone screen and for the second half-tone screen, and wherein N is greater than 2 and less than MAX/2.

4. The method of claim 3 wherein N is 0.25*MAX.

5. A method of generating a bit-map comprising:
   rendering by a processor a bit-map of a first image using a first stochastic half-tone screen;
   rendering by the processor a bit-map of a second image using a second stochastic half-tone screen, wherein the second stochastic half-tone screen is less than 100 percent correlated with, and not an inverse of, the first half-tone screen; and
   merging by the processor the bit-map of the first image with the bit-map of the second image;
   determining a screen of the second half-tone screen set having a coverage level less than a first threshold value and determining a screen of the first half-tone screen set having a coverage level at a second threshold, the second threshold being greater than the first threshold, and
   applying non-white pixels of the determined screen of the second half-tone screen set only at select white pixel locations of the determined screen of the first half-tone screen set.

6. The method of claim 5 wherein merging includes merging the bit-map of the first image with the bit-map of the second image using a logical OR operation.

7. The method of claim 5 wherein the non-white pixels of dot patterns of the second half-tone screen for the coverage levels greater than 1 and less than a predetermined coverage level N are located only at locations that correspond to the white pixel locations of a selected dot pattern of the first half-tone screen for a coverage level (MAX-N), wherein MAX is a maximum coverage level for the first half-tone screen and for the second half-tone screen, and wherein N is greater than 2 and less than MAX/2.

8. The method of claim 7 wherein N is 0.25*MAX.

9. A printing apparatus, comprising:
   an interface adapted to receive print data;
   a memory adapted to store the print data; and,
   a processor adapted to produce a bit-map, the processor being adapted to:
   render a bit-map of a first image using a first stochastic half-tone screen set;
   render a bit-map of a second image using a second stochastic half-tone screen set, wherein the first half-tone screen set and the second half-tone screen set have respectively associated stochastic half-tone screens, and wherein each screen of the second half-tone screen set is less than 100 percent correlated with, and not an inverse of, the associated screen of the first half-tone screen set;
   determine a screen of the second half-tone screen set having a coverage level less than a first threshold value and determine a screen of the first half-tone screen set having a coverage level at a second threshold, and apply non-white pixels of the determined screen of the second half-tone screen set at select white pixel locations of the determined screen of the first half-tone screen set.

10. The printing apparatus of claim 9, wherein the non-white pixels of dot patterns of a half-tone screen of the second half-tone screen set for the coverage levels greater than 1 and less than a predetermined coverage level N are located only at locations that correspond to the white pixel locations of a selected dot pattern of the associated half-tone screen of the first half-tone screen set for a coverage level (MAX-N), wherein MAX is a maximum coverage level for the first half-tone screen and for the second half-tone screen, and wherein N is greater than 2 and less than MAX/2.

* * * * *